United States Patent [19]

Hartmann

[11] Patent Number: 5,694,488
[45] Date of Patent: Dec. 2, 1997

[54] METHOD AND APPARATUS FOR PROCESSING OF RECONSTRUCTED HOLOGRAPHIC IMAGES OF DIGITAL DATA PATTERNS

[75] Inventor: Alfred Clyde Hartmann, Round Rock, Tex.

[73] Assignee: Tamarack Storage Devices, Austin, Tex.

[21] Appl. No.: 604,263

[22] Filed: Feb. 21, 1996

Related U.S. Application Data

[63] Continuation of Ser. No. 173,640, Dec. 23, 1993, abandoned.

[51] Int. Cl.$^6$ ............................................. G06K 9/76
[52] U.S. Cl. ............................................. 382/210
[58] Field of Search ............................... 382/210, 302; 359/1, 16, 29, 32, 35; 250/208.1, 208.2

[56] References Cited

U.S. PATENT DOCUMENTS

| | | |
|---|---|---|
| 3,407,405 | 10/1968 | Hoadley . |
| 3,408,656 | 11/1968 | Lamberts . |
| 3,578,836 | 5/1971 | Hannam . |
| 3,612,641 | 10/1971 | Eaglesfield . |
| 3,635,538 | 1/1972 | Caulfield et al. . |
| 3,837,725 | 9/1974 | Bricot et al. . |
| 3,874,785 | 4/1975 | Huignard et al. . |
| 3,891,976 | 6/1975 | Carlsen . |
| 3,912,391 | 10/1975 | Fleisher et al. . |
| 3,989,347 | 11/1976 | Eschler . |
| 3,998,521 | 12/1976 | Eschler . |

(List continued on next page.)

OTHER PUBLICATIONS

Steve Redfield, "Holographic Storage: Not a Device but a Storage Class," *SPIE*, vol. 1785, p. 45.

Ellen Muraskin, "Memory Crystal," *Popular Science*, p. 38, Aug. 1992.

Kirk Ladendorf, "MCC Spinoff Attracts Influx of Capital," *Austin American-Statesman*, Saturday, Feb. 13, 1993.

News Release of Microelectronics and Computer Technology Corporation dated Feb. 12, 1993.

Carolyn Duffy Marsan, "Holographic Memory Could Revolutionize Info Storage," *Federal Computer Week*, Mar. 25, 1991.

Andrew Pollack, "The Hologram Computers of Tomorrow," *The New York Times*, Jun. 9, 1991.

Steve Redfield and Lambertus Hesselink, "Enhanced Nondestructive Holographic Record in Strontium Barium Niobate," *Optical Society of America*.

*Primary Examiner*—Jose L. Couso
*Attorney, Agent, or Firm*—Gregory M. Howison

[57] ABSTRACT

A method and apparatus for reconstructing holographic images is disclosed. A holographic image is recreated from a holographic storage media (10) by passing a reference beam (38) therethrough, which holographic image comprises a composite data image of discrete binary images arranged in an array. A reconstructed data beam (58) is then directed onto a detector array (42), resulting in a reconstructed composite data image (62) formed on the surface thereof. The detector (42) is comprised of a plurality of detector elements or pixels (92) arranged in an array corresponding to the original array of binary data images that are associated with the reconstructed composite data image (62). The reconstructed composite data image is oversampled such that each discrete binary image in the reconstructed composite data image is associated with, for example, four of the detector elements (92) which define pixels. Each group of pixels that is associated with an image is defined as a bixel. A 2×2 Margolus neighborhood or other suitable cell neighborhood is defined that is scanned across the array in a predetermined manner and transformation rules applied to the output of the four pixels within the Margolus neighborhood window (90). In a first pass, contrast enhancement is provided wherein if one of the pixels is a gray pixel, it is forced to the state of the other pixels. The edges are then defined and then the overall pixels aligned. A new image is created and then processed in accordance with standard techniques to extract the data therefrom.

12 Claims, 6 Drawing Sheets

U.S. PATENT DOCUMENTS

| | | |
|---|---|---|
| 4,032,340 | 6/1977 | Bloom et al. . |
| 4,038,647 | 7/1977 | Schneider . |
| 4,063,226 | 12/1977 | Kozma et al. . |
| 4,063,795 | 12/1977 | Huignard et al. . |
| 4,076,370 | 2/1978 | Wako . |
| 4,138,189 | 2/1979 | Huignard et al. . |
| 4,175,823 | 11/1979 | Pekau et al. . |
| 4,213,193 | 7/1980 | Reid et al. . |
| 4,224,480 | 9/1980 | Satoh et al. . |
| 4,256,362 | 3/1981 | Bardos . |
| 4,282,510 | 8/1981 | Southgate ................................... 382/31 |
| 4,282,511 | 8/1981 | Southgate et al. ........................ 382/31 |
| 4,307,165 | 12/1981 | Blazey et al. . |
| 4,334,007 | 6/1982 | Tinet et al. . |
| 4,336,976 | 6/1982 | Rodemann et al. . |
| 4,362,806 | 12/1982 | Whitmore . |
| 4,458,345 | 7/1984 | Bjorklund et al. . |
| 4,550,395 | 10/1985 | Carlson . |
| 4,636,027 | 1/1987 | Dube . |
| 4,687,720 | 8/1987 | Wreede et al. . |
| 4,789,977 | 12/1988 | Oudenhuysen et al. . |
| 4,799,746 | 1/1989 | Wreede . |
| 4,805,228 | 2/1989 | Jenkins et al. ............................. 382/49 |
| 4,839,250 | 6/1989 | Cowan . |
| 4,927,220 | 5/1990 | Hesselink et al. . |
| 4,961,615 | 10/1990 | Owechko et al. . |
| 4,972,498 | 11/1990 | Leib .......................................... 359/29 |
| 4,983,003 | 1/1991 | Wreede et al. . |
| 4,994,664 | 2/1991 | Veldkamp ............................ 250/280.2 |
| 5,007,690 | 4/1991 | Chern et al. . |
| 5,095,375 | 3/1992 | Bolt . |
| 5,212,572 | 5/1993 | Krantz et al. . |

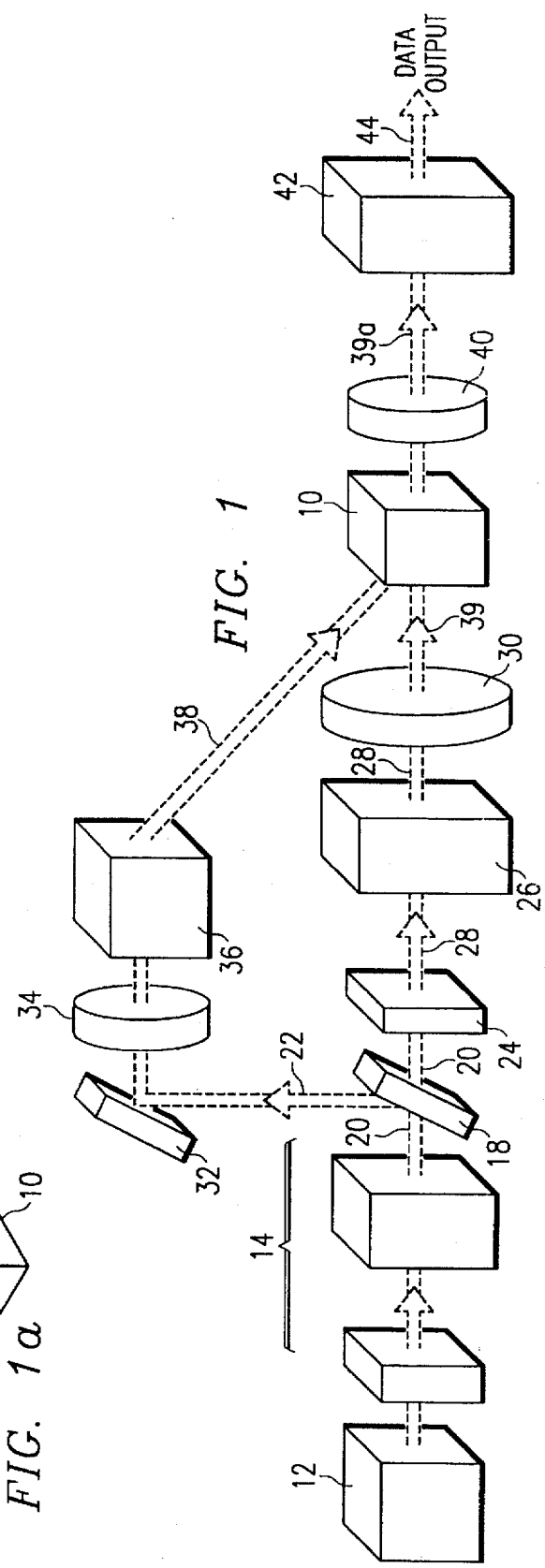
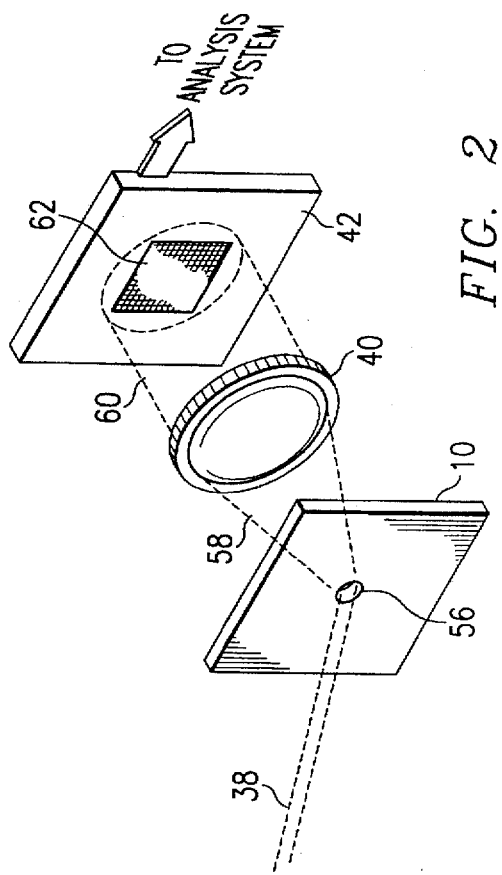
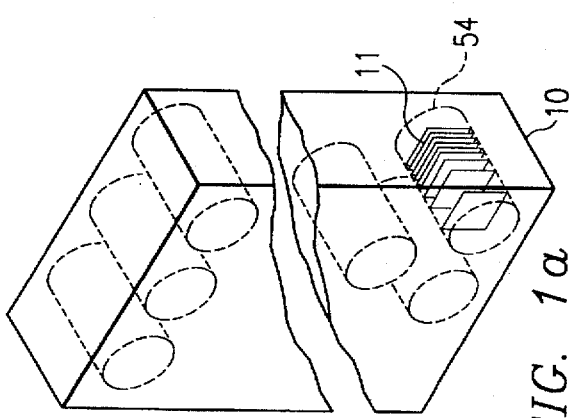

METHOD AND APPARATUS FOR PROCESSING OF RECONSTRUCTED HOLOGRAPHIC IMAGES OF DIGITAL DATA PATTERNS

This application is a continuation of application Ser. No. 08/173,640, filed Dec. 23, 1993, now abandoned.

TECHNICAL FIELD OF THE INVENTION

The present invention pertains in general to holographic memories, and more particularly, to the recovery of information from the detected image during a Read operation in the holographic memory.

CROSS REFERENCE TO RELATED APPLICATIONS

This application is related to U.S. Pat. application Ser. No. 08/173,668, filed Dec. 23, 1993, entitled "Space Lock Loop for Spatial Information Recovery in an Image"

BACKGROUND OF THE INVENTION

As the need for increased data storage changes, the search for higher density, faster access memory technologies also increases. One of these, holographic data storage, provides the promise for increased access to higher density data. The techniques for realizing such storage typically utilize some type of photo-active storage media, such as photorefractive crystals or photopolymer layers, to store 3-D "stacks" of data in the form of pages of data. Typically, coherent light beams from lasers are utilized to perform the addressing, writing and reading of the data from the storage media by directing these beams at a specific region on the surface of the media. Writing is achieved by storing the interference pattern formed by these beams at this region. Reading is achieved by detecting a reconstructed light beam as it exits the storage medium, the data then being recovered therefrom as a data image. Addressing is achieved by the positioning of the laser beams, and this is typically done through the mechanical movement of mirrors or lenses; however, the storage media itself can be moved relative to fixed laser beams, or motionless beam steering devices such as acousto-optic deflectors, may be employed.

During a Read operation, a given storage location within the holographic storage media is irradiated with a reference laser beam to generate a reconstructed data beam. The reconstructed data beam contains the information that was stored in the holographic storage media. This information is in the form of an image of a data pattern. This data pattern is typically comprised of a grid of "black" and "white" marks, the "white" marks representing a logic "1" and the "black" marks representing a logic "0". The image of each of the individual data bits (marks) is defined as a two-dimensional bit pixel or "bixel". During data recovery, the reconstructed data image is directed toward a detector array, which detector array comprises a plurality of detector cells or pixels, one or more associated with each of the bixels. In a typical oversampled system, there may be four pixels for each data bit or bixel, each of these individual pixels representing a small sample of the readout image.

Since the initial encoded data that is stored in the holographic storage media is an image of a data pattern, the reconstructed data is also an image. However, due to imperfections in the optical systems utilized for the recording operation, and subsequently for reconstructing the data image, there may be distortions and offsets associated with the data relative to the pixel elements, which pixel elements are arranged in a grid. As such, the individual bixels may have a slight offset relative to the associated pixel elements or pixels. This can cause moiré, or misalignment, patterns to exist in the detected image. In order to correct for this, some type of processing must be performed on adjacent pixels, which can consume a large amount of processing capacity and result in an excessively complex system, or one with an excessive bit error rate (BER).

SUMMARY OF THE INVENTION

The present invention disclosed and claimed herein comprises a method for receiving a two-dimensional composite data image that is comprised of an array of discrete multi-state data samples. A detector array is provided that has a plurality of individual pixel detector elements that are arranged in a pattern corresponding to the position of the discrete data images in the composite data image. The composite data image is then disposed over the detector to allow the image to be detected by the pixels. The output of the detector array is then processed with a cellular automata algorithm that is operable to alter the states of the pixels to one of the multiple states of the data image to create a reconstructed composite image. This reconstructed composite image is then output for decoding of the data therein.

In another aspect of the present invention, the discrete multi-state data images are binary. They are disposed on a two-dimensional grid with each of the discrete data images being rectangular in shape and disposed adjacent to each other. Therefore, the detector array is also a grid of pixel elements, each having a rectangular shape. In one embodiment, the detector array is configured such that a plurality of pixel elements are associated with each of the discrete data images, these pixels defining a bixel.

In a further aspect of the present invention, the composite data image is processed by creating at least one state machine cell that encompasses a predetermined number of pixels in the array. The state machine cell operates in accordance with predetermined transformation rules that are operable to alter the state of the pixels in the state machine cell as a function of the outputs of each of the pixels associated with the state machine cells. A single cell can be utilized and moved across the two-dimensional surface of the detector array output or a plurality of state machine cells can be utilized that operate in parallel.

In a yet further aspect of the present invention, the transformation rules are operable to adjust the contrast in the data image by converting the output of pixels having a level between two of the multiple states to an output equivalent to only one of the multiple states in accordance with predetermined threshold criteria. Further, a determination is made as to whether the pixels within the state machine cell are associated with a horizontal or vertical edge of the discrete data image and associated bixel.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates an overall block diagram of a holographic storage assembly,

FIG. 1a illustrates a detail of the recording media;

FIG. 2 illustrates a perspective view of the detector array in detail;

DETAILED DESCRIPTION OF THE INVENTION

Figure 3:
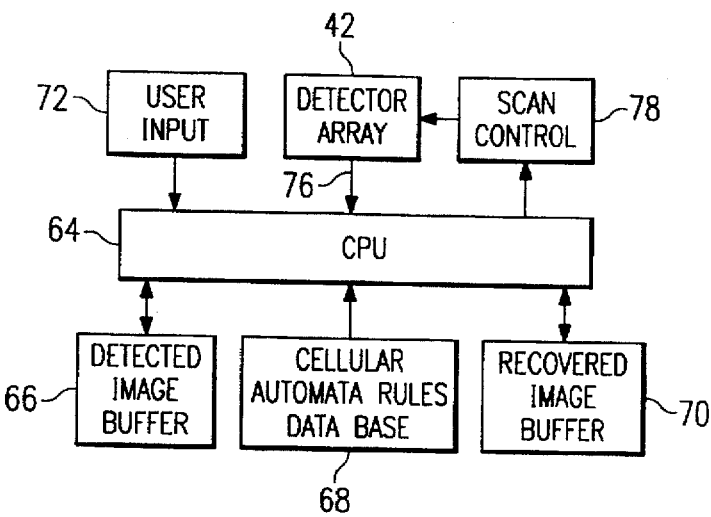
FIG. 3 illustrates a block diagram of the system for processing the detected image from the detector array.

Referring now to FIG. 1, there is illustrated a holographic storage assembly which is operable to store data in a transparent holographic storage recording media 10 and extract that data therefrom. The data is organized in the recording media as an array of stacks of pages 11 (images). This is illustrated in FIG. 1a, wherein each of the stacks of pages 11 occupies a small region 54 of the recording media 10, with each of the pages in each of the regions 54 comprising an interference grating, all of the interference gratings in a given region 54 superimposed over each other. A laser 12 is provided, which can be comprised of, for example, a diode-pumped YAG (yttrium aluminum garnet) laser with a power output of around 80 milliwatts, with a wavelength in the range of 532 nanometers. The output beam of the laser is processed by a stack-selector assembly 14 which steers the beam to the location of an individual stack of pages 11 in the recording media 10. The output of the stack selector assembly 14 is then passed to a beam splitter 18 which separates the beam into two beams, a data beam 20 and a reference beam 22.

The data beam 20 is expanded by a beam expander 24 which is then input to a Spatial Light Modulator (SLM) 26 to output an expanded data beam 28. The SLM 26 receives data from a computer system (not shown) and then this data is superimposed on the expanded data beam 28 by the SLM 26, creating a bit pattern of light and dark spots in the conventional manner. This pattern of spots represents the bits on the page to be stored. After the SLM 26, the data beam is then passed through a focusing system 30 which then focuses the beam onto a select portion of the surface of the holographic storage media 10. This focused data beam 39 is the Fourier transform, or other suitable representation, of the pattern of spots, or page.

The reference beam 22 is reflected from a mirror 32 and then passed through a polarization rotator 34, the polarization orientation dictated by an external control signal. This rotator is utilized to adjust the polarization of the reference beam 22 during a read operation. The output of the polarization rotator 34 is then input to a page addressing deflector system 36 system which defines the angle at which the reference beam will impinge the surface of the recording media 10 and also the location thereof on the surface of the recording media 10. This is represented by a deflected reference beam 38.

As the two beams, the data beam and the reference beam, enter the recording media 10, the reference beam interferes with the data beam, writing an interference grating, or hologram, in the storage media 10. In the case of a photorefractive material, the grating pattern results from a stored electronic-charge pattern that modifies the optical properties of the crystallite. In the case of photopolymer material, certain areas of the photopolymer material are polymerized to form the interference grating. The result is a 3-D holographic image of the Fourier transform of the bit pattern carried in the data beam. This stored interference grating allows the original data beam to be recreated when the system reads the data using only the reference beam. This process on which the interference grating is formed on the recording media 10 is basically the Write process for a holographic storage material.

The Write process is repeated a number of times, with the angle of the reference beam operable to be changed each time, to record a plurality of interference gratings. Each of the interference gratings is associated with a different input bit pattern, which interference gratings are superimposed over each other. This collection of superimposed recordings is called a stack. The recordings that comprise each of the stacks are angularly multiplexed within each of the stacks.

During a Read cycle, the data beam is shut off so that only the deflected reference beam 38 is input to the storage media 10 at the appropriate angle and location. The angle is determined by the desired page in that particular stack. The deflected reference beam 38 will be constructively diffracted by the interference grating that was recorded with a particular underlying spatial frequency that corresponds to the deflected reference beam's particular angle. This results in a reconstructed image of the original bit pattern that was stored there with a reference beam with that particular angle. The diffracted reference beam 39, or reconstructed data beam, then passes through the storage media 10 into a focusing system 40 which focuses the reconstructed image onto the surface of a detector array 42 of, for example, a Charge-Coupled Device or other suitable photodetector that captures the reconstructed light and dark bit patterns of the image and then converts them back to digital electronic signals for transfer to a computer. This is represented by a data output line 44.

Referring now to FIG. 2, there is illustrated a detail view of the detector 42 and the focusing optics 40. During a Read operation, the reference beam 38 is directed to a storage location 56 on the storage media 10. This will result in a reconstructed data beam 58 being directed in the same direction as the original data beam that was utilized to store the Fourier transform of the original encoded data. This is focused by the optics 40 to a columnar beam 60 that is directed to the surface of the detector array 42. The detector array 42 is comprised of a grid of optical sensing elements such as Charge Coupled Devices (CCDs) or other suitable photodetectors which are disposed in an abutting relationship such that each of the CCD elements occupies a single "pixel" and all light impinging thereon will be collected and result in the generation of an output therefrom. The level of the output from the CCD will be a function of the amount of light impinging upon the surface of the CCD integrated over the entire surface of the CCD.

A reconstructed data image 62 is formed on the surface of the detector 42. This image 62 is comprised of a grid of black and white data images on a 256×256 grid, each of the images representing a logic "1" or a logic "0". As will be described hereinbelow, the CCD pixel elements are arranged in an oversampled configuration such that there are a plurality of pixels for each data image, each data image referred to as "bixel". In the preferred embodiment, the configuration is a 2×2 oversampling, such that there are four pixels for each bixel. The output of the detector 42 is input to an analysis system. However, as will be described hereinbelow, to detect the data in the image, the image must be aligned on the detector such that each of the bixels have the edges thereof substantially aligned with the edges of the associated pixel or pixels of the detector. If the alignment is not exact, some data will be blurred. The present invention is utilized to correct for any misalignment in the image prior to extracting the data therefrom, and also to correct any intensity variation in the data image not due to the data pattern itself.

Referring now to FIG. 3, there is illustrated an overall block diagram of the analysis system. In general, a central processing unit (CPU) 64 is provided, which is any conventional computational system. It could be a full size personal computer or it could be a microprocessor based board or microcontroller. The CPU 64 has associated therewith a processing unit and all of the peripheral circuitry required to allow execution of instructions, transfer of data to or from a memory device and access through various data buses and address buses to the outside world through an I/O (not shown). The CPU 64 is interfaced with a memory section which is comprised in part of a detected image buffer 66, a cellular automata rules database 68 and a recovered image buffer 70. Although not shown, various non-volatile memories are provided such as a Read Only Memory for storing program information, etc. The buffers 66 and 70 and the database 68 are typically stored in a volatile memory such as RAM. A user input 72 is provided for allowing a user to interface with the CPU 64. This allows downloading and uploading of data. The detector array 42 is interfaced with the CPU through a data bus 76 with a scan control system 78 provided for controlling the output of data from the detector array 42. The detector array 42 is illustrated as being separate from the CPU 64. However, as will be described briefly herein, the detector array could have a portion of the automata system integrated therewith in the form of logic.

The present invention is directed toward the recovery of two-dimensional digital data patterns that are accessed optically as binary or gray scale values through imaging of the two-dimensional data pattern onto the detector array 42. The algorithm described hereinbelow makes context-sensitive data recovery decisions with cellular automata to allow a lower recovered bit error rate (BER) to be achieved, as compared to a classical align and threshold technique of digital data read out. In general, cellular automata are two-dimensional arrays of finite state machine cells that alter their state based on the state of a small neighborhood of cells. This local context provides a higher probability of correct data recovery than do methods based upon alignment to data, scaling of the readout signal, adjustment of threshold decision levels and comparison of scaled signal values to adjusted threshold levels.

Due to the imperfections in reading out and imaging the encoded data through an optical path onto the detector array 42, simple thresholding of detected gray scale values may not be sufficient to restore the original data pattern with high fidelity. Intelligent data recognition can be done by employing the cellular automata technique to perform contrast enhancement, edge detection, edge extension, digital data pattern recognition and two-dimensional data alignment. This is useful in that the two-dimensional data pattern may have been corrupted by noise, crosstalk, inter-symbol interference, coherent interference patterns, spatial frequency filtering, poor illumination and image distortion.

Figure 4:
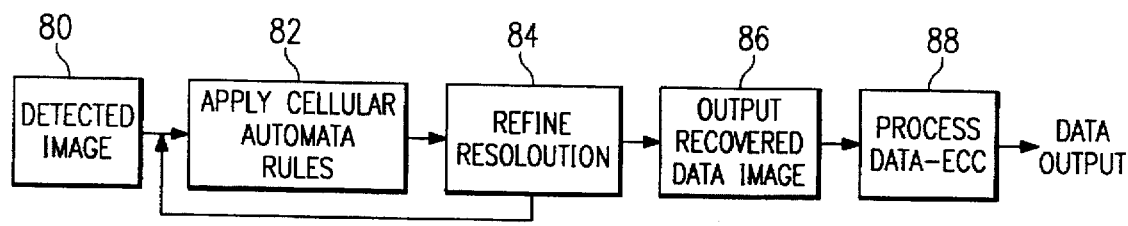
FIG. 4 illustrates a process flow for the reconstruction operation applied to the raw data image.

Referring now to FIG. 4, there is illustrated a process flow for processing the detected image. The detected image is represented by a block 80, which detected image is then processed by applying various cellular automata rules within the finite state machine cells, as represented by a block 82. The process will then flow to a block 84 to refine the resolution by continuously applying and refining the cellular automata rules. After the resolution has been refined to the desired extent, the recovered data image is then stored in an output buffer, as represented by a block 86. This data is then processed utilizing various error correction techniques, as indicated by a block 88. It will be appreciated that the cellular automata rules are applied to the detected image to provide a recovered image, which image can then be processed in accordance with general image detection techniques. One aspect of the present invention is to enhance the detected image prior to processing and detection of the data therein.

Figure 5:
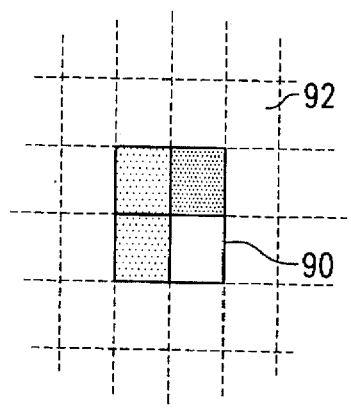
FIG. 5 illustrates a 2×2 Margolus neighborhood window.

Referring now to FIG. 5, there is illustrated a Margolus neighborhood for the cellular automaton process, which defines the pixel boundaries of the finite state machine. The cellular automaton is represented by a box 90 which is disposed over the grid of pixels 92. The box or automaton 90 is illustrated as aligning with four of the pixels 92, which are designated as upper left (UL), upper right (UR), lower left (LL) and lower right (LR). The UL and LL pixels in the automaton 90 are illustrated as being at a gray level, i.e., at a lower than full output, the UR pixel is illustrated at being at a black level, i.e., substantially no output, and the LR pixel is illustrated as being at a white level, i.e., at a substantially full output. A gray level pixel results from only a portion of the CCD cell associated with that pixel being covered by a black image. Since the CCD associated with the pixel integrates over its entire surface, an overlapping black pixel adjacent to a white pixel will cause a less than full output. This is due to misalignment of the edges of the data image with the edges of the pixels in the detector array 42. This automaton 90 defines a 2×2 neighborhood with the states of the four cells providing input arguments. Transformation rules are then applied to these input arguments to obtain new cell states. This cellular automaton 90 is therefore defined as operating on a "neighborhood window".

Figure 6:
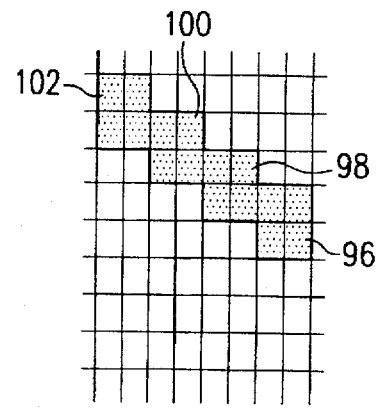
FIG. 6 illustrates pipelining of the Margolus neighborhood windows.

Referring now to FIG. 6, there is illustrated a higher level view of the grid of pixels illustrating a two-by-two Margolus neighborhood being scanned from left to right in a pipeline manner. Although a true parallel configuration could be utilized wherein each pixel made a decision at each stage of the transformation by applying the particular transformation rule to the pixel at that stage, this could be computation-intensive. From a hardware standpoint, a pipeline configuration may be more economical. In the configuration illustrated in FIG. 6, there are illustrated four stages of the pipeline. The first stage is initiated at the upper corner of the grid for the first transformation rule which is initiated at a first 2×2 Margolus neighborhood that is incremented across a row from left to right. When it reaches the farmost right extrema, it is shifted down by one row to the leftmost extrema of that row and then is moved across it from left to right. Following the first 2×2 Margolus neighborhood window for the first transformation rule is a second Margolus neighborhood window for the second transformation rule, which is offset by one row and two columns. This Margolus neighborhood will again follow the first Margolus neighborhood across each row and then shift down by one row and start on the next row and be initiated at the beginning column. Since there are four transformations, this will be represented by four Margolus neighborhood windows being implemented across and downward in a diagonal configuration. There are illustrated four Margolus neighborhood windows, a window 96, a window 98, a window 100 and a window 102. The window 96 represents the first transformation rule which must traverse one row before the second window 98 associated with the second transformation rule is initiated. This is followed by the window 100 associated with the third transformation rule and the window 102 associated with the fourth transformation rule. If further transformation rules are utilized in accomplishing the cellular automaton algorithm, these will also follow.

Figure 7A:
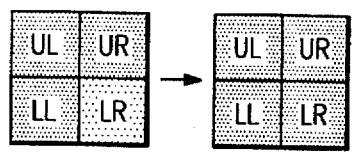
FIGS. 7a and 7b illustrate a diagrammatic view of the transformation rules for contrast enhancement.
Figure 7B:
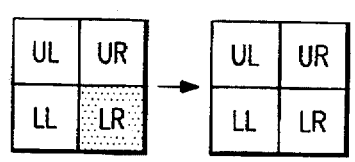

Referring now to FIGS. 7a and 7b, there are illustrated diagrammatic views of example transformation rules for contrast enhancement. In contrast enhancement, a set of four pixels in the array is examined as a single 2×2 Margolus neighborhood. In FIG. 7a, the first transformation rule for contrast enhancement is illustrated wherein if the upper left (UL), upper right (UR) and lower left (LL) pixels are "black" and the lower right (LR) pixel is "gray", the lower right pixel will be shifted to black, resulting in all four pixels being at a "black" level. In the decision making process, the first "pass" through the array will utilize various thresholds for gray and black. In the first pass, black could be at a level below 10% output and gray could be any level above 60% output but less than full output. On the next pass through the array, black could be at a level below 5% output and gray could be at a level above 70%. This would continue until the upper thresholds of the gray level were found. This would not apply to a "white" level, which would exist at a threshold above the level defined as a gray output, since the contrast enhancement is primarily designed to remove gray pixels from the image and replace them with white or black pixels corresponding to the original data states as written in the recording process.

Referring now to FIG. 7b, there is illustrated a transformation rule for contrast enhancement wherein a Margolus neighborhood of four pixels has three white pixels, the UL pixel, UR pixel and LL pixel, and a gray pixel in the LR pixel. This LR pixel is converted to a white pixel in this transformation rule. Initially, the decision is based upon the white pixels being above a certain level and a gray level being below a certain level. Thereafter, the threshold level defining a white level is raised and the threshold defining a gray level will be raised.

Figure 8A:
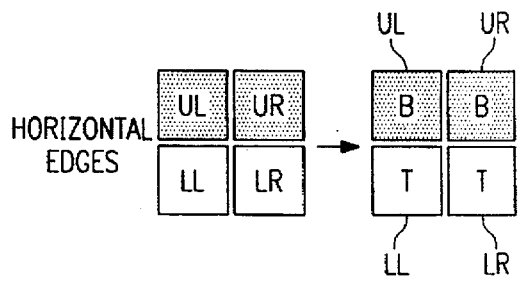
FIGS. 8a and 8b illustrate a diagrammatic view of the transformation rules for edge detection.
Figure 8B:
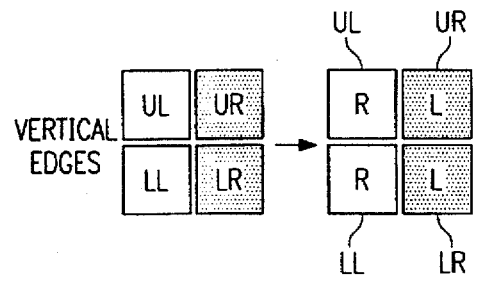

Referring now to FIGS. 8a and 8b, there is illustrated a diagrammatic view of the transformation rules for defining horizontal and vertical edges. In FIG. 8a, there is illustrated the transformation rules for defining horizontal edges. In a given Margolus neighborhood, there are four pixels, the UL pixel, the UR pixel, the LL pixel and the LR pixel. If both the UL and the UR pixels are black and the LL and LR pixels are white, the UL and UR pixels will be designated as the "bottom" pixels in a given bixel and the LL and LR pixels will be designated at the "top" pixels in a given bixel. The transformation will result in a designation being associated with the each of the pixels, as illustrated in the right side of FIG. 8a with a "B" associated with the UL and UR pixels and a "T" associated with the LL and LR pixels.

Referring now to FIG. 8b, there is illustrated the transformation rules for defining the vertical edges. In a given Margolus neighborhood, the four pixels are examined for a given threshold level for black and white. If the UL and LL pixels are white and the UR and LR pixels are black, this will indicate a vertical edge. The UL and LL pixels will then be designated as the "rightmost" pixels of a given bixel and the UR and LR pixels will be designated as the "leftmost" pixels in a given bixel. They will be so designated as illustrated in the diagram to the right of FIG. 8b, wherein the UL and LL pixels are designated by an "R" and the UR and LR pixels are designated by an "L" designation.

Figure 9A:
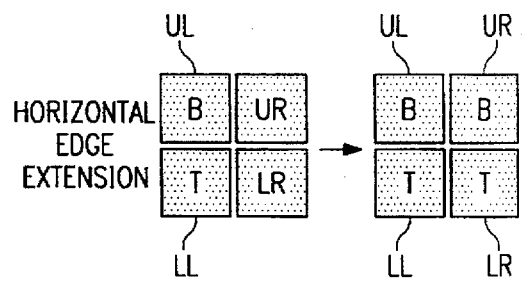
FIGS. 9a and 9b illustrate the transformation rules for horizontal and vertical edge extensions.
Figure 9B:
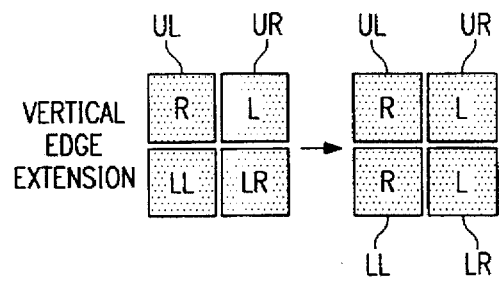

Referring now to FIGS. 9a and 9b, there are illustrated the transformation rules for edge extension. Whenever a pass is made through a given image, there will be ambiguities wherein no designation is made as to whether the edge is a horizontal edge or a vertical edge such as may occur for runs of successive bixels of the same state. In this situation, a previous horizontal edge which abruptly ended in accordance with the decision made as described above with respect to FIGS. 8a and 8b can be extended according to transformation rules described herein.

With specific reference to FIG. 9a, there is illustrated a diagrammatic view specifically for the horizontal edge extension transformation. In the illustrated Margolus neighborhood, a previous designation made in accordance with the transformation rules of FIGS. 8a and 8b resulted in the UL pixel being designated a bottom pixel and the LL pixel being designated as a top pixel, with the UR and LR pixels not being designated. This condition will then result in the UR pixel being designated as a bottom pixel and the LL pixel being designated as a top pixel, the transformation illustrated to the right of the diagram in FIG. 9a.

With specific reference to FIG. 9b, there is illustrated the transformation rule for the vertical edge extension. In the Margolus neighborhood illustrated in FIG. 9b, the UL pixel is designated as a Right pixel and the UL pixel is designated as a Left pixel and the LL and LR pixels are not designated. The transformation rules would force the LL pixel to be designated as a Right pixel and the LR pixel to be designated as a Left pixel. The transformation is diagrammatically illustrated to the right side of the diagram of FIG. 9b. The rule set for edge extension may be further refined to prevent edges from running too close together, depending upon the degree of oversampling.

Figure 10:
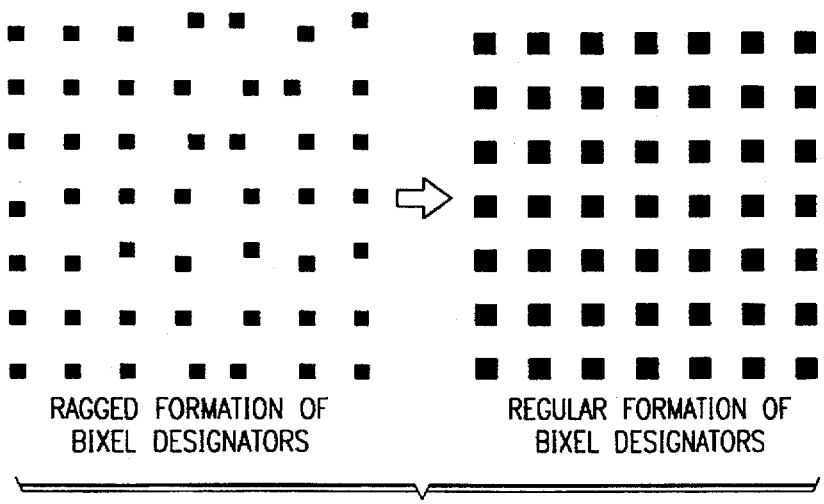
FIG. 10 illustrates a diagrammatic view of the data alignment operation.
Figure 10A:
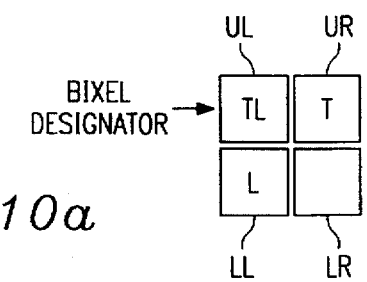
FIG. 10a illustrates a diagrammatic view of the translation rules for data alignment.

Referring now to FIG. 10, there is illustrated a diagrammatic view for the transformation resulting in data alignment. On the left side of the diagram of FIG. 10, there is illustrated an array representing a ragged or irregular array of bixel designators. As will be described hereinbelow, each bixel has one pixel that serves to designate that bixel, such as the top left pixel of the bixel. By examining these designators, distortions in the image can be evaluated. This is achieved since each of the bixels now has a top, bottom, left and right designated edge. The alignment procedure basically provides for a shift in the position of the designator along a given row or a given column, such that they line up in a regular matrix. This is illustrated in the right side of the diagram of FIG. 10. FIG. 10a illustrates the designation wherein the UL pixel in a given bixel is defined as the bixel designator, this being designated only in bixels that have a defined bottom, top, left and right edge. Care must be taken that exactly one designator is chosen for each bixel, or errors in data alignment will be made.

Figure 11:
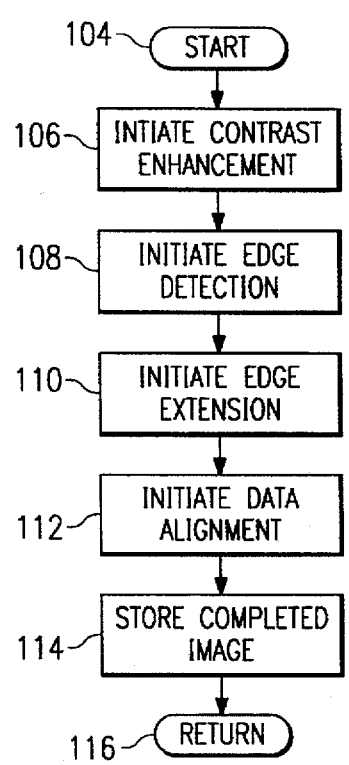
FIG. 11 illustrates an overall flowchart for the data reconstruction operation.

Referring now to FIG. 11, there is illustrated a flowchart of the overall process, which is initiated at a start block 104 and then proceeds to a function block 106 to initiate the contrast enhancement transformation, which involves a number of passes. The program then flows to a function block 108 to initiate the edge detection transformation rules, which also involve a number of passes. The program then flows to a function block 110 to initiate the edge extension transformation, which requires a number of passes. The program then flows to a function block 112 to initiate the data alignment transformation rules which require a number of passes. After the data alignment transformation rules, a new image will be present, which is stored in a memory, as indicated by a function block 114. The program then flows to a return block 116.

Figure 12:
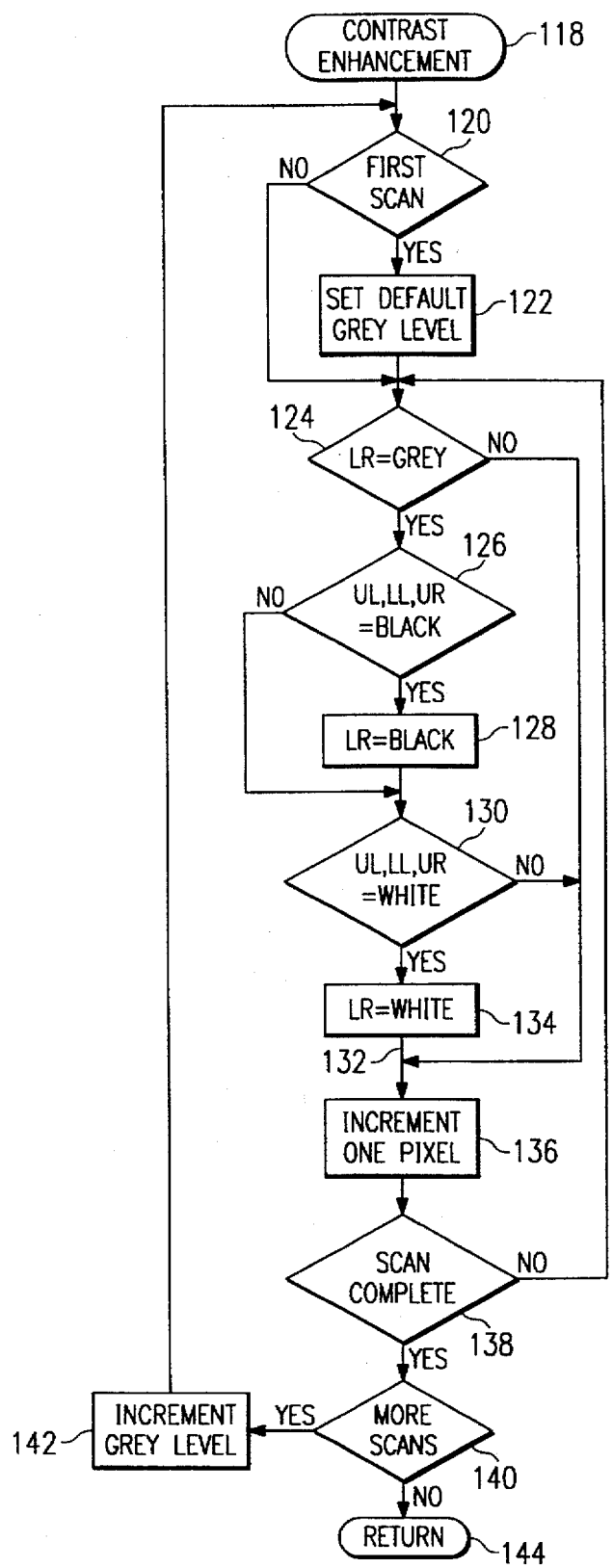
FIG. 12 illustrates a flowchart for the contrast enhancement transformation.

Referring now to FIG. 12, there is illustrated a flowchart depicting the operation of the contrast enhancement transformation rules, which is initiated at a block 118. The program then flows to a decision block 120 to determine if this is the first scan. If so, the program flows to a function block 122 to set the default gray level and then to a decision block 124. If this is a subsequent scan to the first scan, the program will flow from the decision block 120 along the "N" path to the input of a decision block 124.

In the decision block 124, a decision is made as to whether the LR pixel is a gray pixel. This is achieved by comparing the output level of the LR pixel to the threshold window defining what a gray pixel is. This threshold window will define a lower and upper limit of the grey pixel, which is changed, depending upon whether it is a default level or a higher level, which will be described hereinbelow. If it is determined that the LR pixel is a gray pixel, the program will flow to a decision block 126 to determine if the UL, LL and UR pixels are black. If so, the program flows to a function block 128 to set the LR pixel equal to a black pixel. If all of the UL, LL and UR pixels are not black pixels, the program will flow along the "N" path to the input of a decision block 130. The output of the function block 128 will also flow to the input of a decision block 130. The decision block 130 determines whether the UL, LL and UR pixels are white pixels. If the LR pixel had previously been set to a black pixel in function block 128, this will not be the case, as it had already been determined by the decision block 126 that the UL, LL and UR pixels were black. In this case, the program will flow along a "N" path to a node 132. However, if the UL, LL and UR pixels were determined to be white, indicating that the path from the decision block 126 had gone along the "N" path, the program would flow along a "Y" path from decision block 130 to a function block 134 to set the LR pixel to have a white value. The program would then flow to the node 132. Additionally, if the LR pixel had been determined in the decision block 124 not to be a gray pixel, it would flow along an "N" path therefrom to the node 132.

The program flows from a node 132 to a function block 136 to increment the grid by a single pixel along a given row, or to the first pixel in the next row, if the last pixel in the given row was processed, and then to a decision block 138 to determine if the scan has been completed, i.e., the lowermost and rightmost pixel in a left to right, top to bottom scan had been reached. If not, the program would flow along the "N" path back to the input of the decision block 124. However, once the scan of the entire image has been complete, the program would flow to a decision block 140 along the "Y" path to determine if more scans were necessary. The program flows along a "Y" path to a function block 142 to increment the threshold level for the gray level to refine the decision making process. The program then flows to the input of decision block 120. However, if this is the last scan, the program will flow from the decision block 140 along the "N" path to a return block 144.

Figure 13:
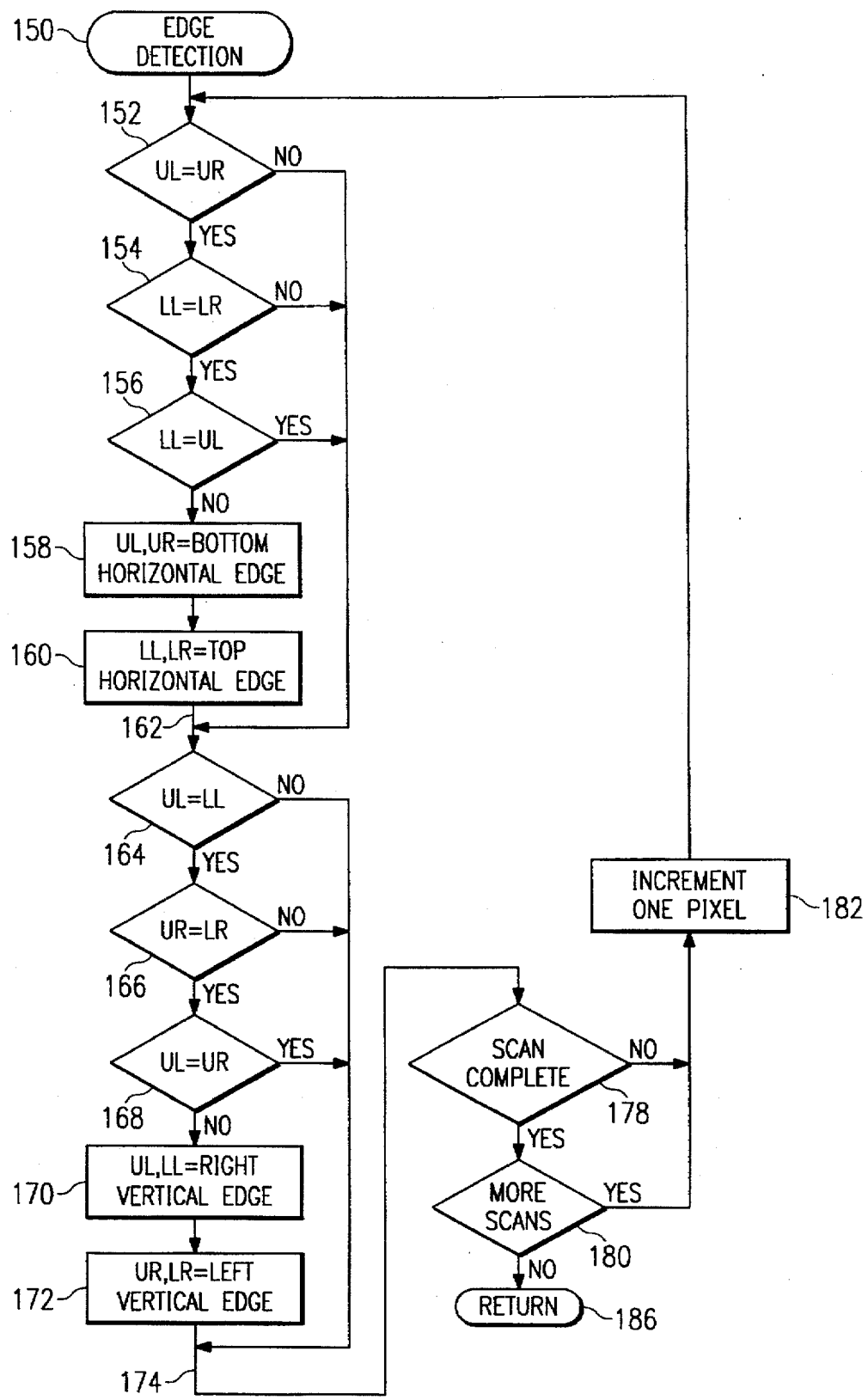
FIG. 13 illustrates a flowchart for the edge detection transformation.

Referring now to FIG. 13, there is illustrated a flowchart for the edge detection and transformation rules, which is initiated at a block 150 and then proceeds to a decision block 152. Decision block 152 determines whether the UL pixel is substantially identical to the UR pixel. If so, the program flows along the "Y" path to a decision block 154 to determine if the LL pixel is substantially identical to the LR pixel. If so, the program will flow along the "Y" path to a decision block 156 to determine if the LL pixel is substantially identical to the UL pixel. The decision blocks 152 and 154 determine whether the UL and LL pixels are identical, indicating the operation wherein the horizontal edge is defined, i.e., where both top pixels are substantially identical and both bottom pixels are substantially identical. Decision block 156 determines whether the top pixels and the bottom pixels are different. If different, the program will flow along the "N" path from decision block 156 to a function block 158 to designate the UL and UR pixels as the bottom horizontal edge and then to a function block 160 to designate the LL and LR pixels as the top horizontal edge. The program then flows to a node 162. If the decision blocks 152 and 154 had determined that either the two upper pixels or the two lower pixels were not substantially equal, the decision blocks 152 and 154 would flow along the respective "N" paths to the node 152. Additionally, if it had been determined that the LL pixel was substantially identical to the UL pixel, thus indicating that the Margolus neighborhood pixels were all black or all white, the program would flow along a "Y" path to the node 162.

The node 162 flows to a decision block 164 to determine if the UL pixel is substantially identical to the LL pixel. If so, the program flows along the "Y" path to a decision block 166 to determine if the UR pixel is substantially identical to the LR pixel. If so, the program flows along the "Y" path to a decision block 168 to determine if the UL pixel is substantially equal to the UR pixel. The decision blocks 164 and 166 determine whether the left pixels are identical and the right pixels are identical, with decision block 168 determining that the left and right pixels are different. If this is true, the program will flow along the "N" path from decision block 168 to a function block 170 to designate the UL and LL pixels as the right vertical edge and then to a function block 172 to designate the UR and LR pixels as the left vertical edge. The program will then flow to a node 174. If it is determined that either the left pixels are not substantially identical or the right pixels are not substantially identical, the program will flow from the respective decision blocks 164 and 166 along the respective "N" paths thereof to the node 174. Additionally, if it is determined that the UL pixel is not substantially identical to the UR pixel, i.e., wherein all pixels are the same color, the program will flow along a "Y" path from decision block 168 to the node 174.

The program flows from the node 174 to the input of a decision block 178 to determine if the scan is complete. If so, the program flows along the "Y" path to a decision block 182 to determine if more scans are needed. If more scans are needed, or if the scan is not complete, the program will flow from the respective decision blocks 178 and 180 along the respective "N" path and "Y" path to the input of a function block 182 to increment the scan by one pixel. The program will then flow from function block 182 to the input of decision block 152. When all scans are completed, the program will flow from the decision block 180 along the "N" path to a return block 186.

Figure 14:
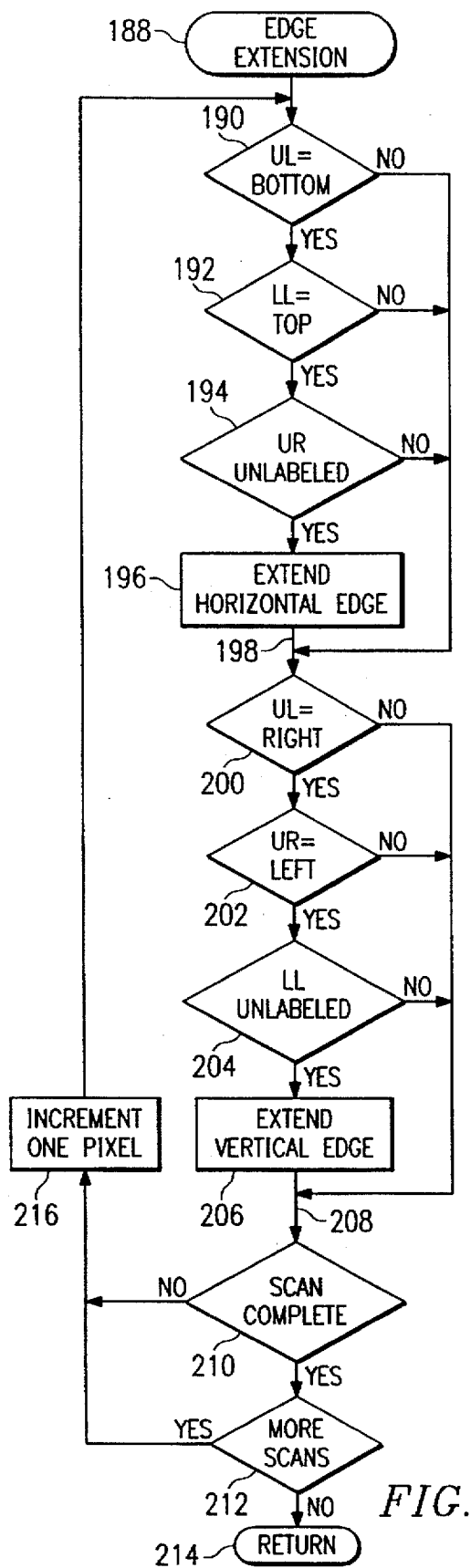
FIG. 14 illustrates a flowchart for the edge extension transformation operation.

Referring now to FIG. 14, there is illustrated a flowchart depicting the operation of the edge extension transformation rules, which is initiated at a block 188 and then flows to a decision block 190. The decision block 190 determines whether the UL pixel is designated as the bottom pixel. As such, the program flows along the "Y" path to a decision block 192 to determine if the LL pixel is designated as the top pixel. If so, the program flows along a "Y" path to a decision block 194 to determine if the UL block is unlabelled. If so, the program flows to a function block 196 to extend the horizontal edge and label the UR pixel as the bottom pixel and the LR pixel as the top pixel. The program then flows to a node 198. If either the UL pixel were not labelled as the bottom pixel or the LL pixel were not labelled the top pixel, the program would flow from either of the decision blocks 190 or 192 along the "N" path thereof to a node 198. Additionally, if the UR pixel is unlabelled, the program would flow from the node decision block 194 to the node 198.

The program flows in the node 198 to a decision block 200 to determine if the UL pixel is designated as the right pixel. If so, the program flows along a "Y" path to a decision block 202 to determine if the UR pixel is designated as the left pixel. If so, the program will flow along a "Y" path to a decision block 204 to determine if the LL pixel is unlabelled. If so, the program flows along a "Y" path to a function block 206 to extend the vertical edge by labelling the LL pixel as a right pixel and the LR pixel as the left pixel. The program then flows to a node 208. Additionally, if either the UL pixel was not designated as the Right pixel, the UR pixel is not designated as the Left pixel or the LL pixel were labelled, the program would flow from the decision blocks 200, 202 and 204 along the respective "N" paths thereof to the node 208.

The program flows from the node 208 to a decision block 210 to determine if the scan is complete. If so, the program then flow along the "Y" path to a decision block 212 to determine if more scans are needed. If not, the program would flow to a return block 214. However, if the scan is not being completed, the program would flow along an "N" path from decision block 210 to a function block 216 to increment the scan by one pixel and then to the input of decision block 190. If more scans were needed, the program would also flow to the input of the function block 216 along the "Y" path from decision block 212.

Figure 15:
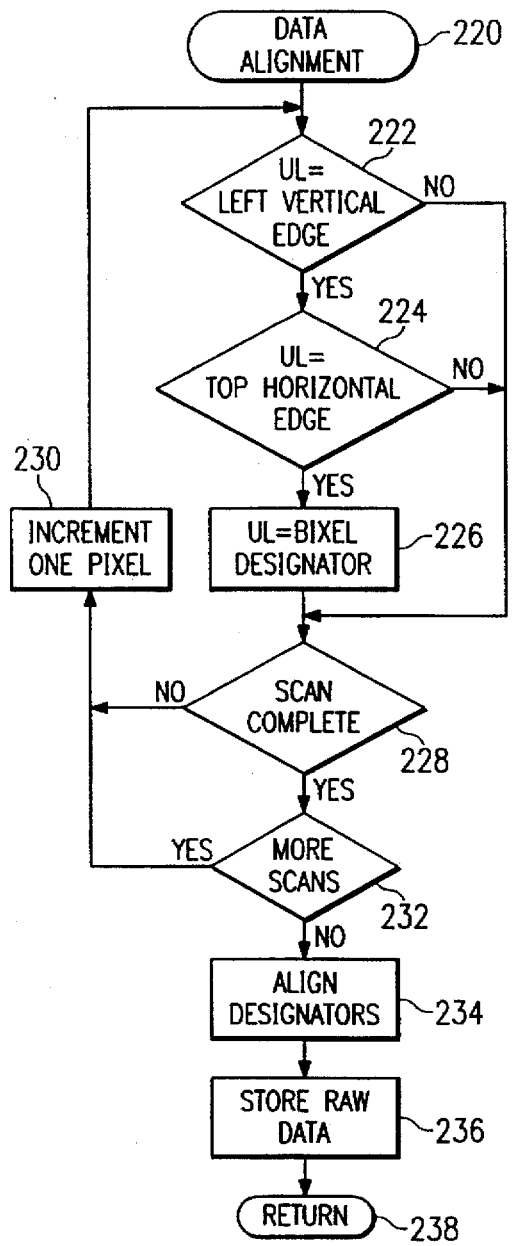
FIG. 15 illustrates a flowchart for the data alignment transformation operation.

Referring now to FIG. 15, there is illustrated a flowchart depicting the data alignment transformation rules, which is initiated at a block 220 and then proceeds to a decision block 222. The decision block 222 determines whether the UL pixel is designated as the left vertical edge. If so, the program flows to a decision block 224 along the "Y" path to determine if UL pixel is designated as the top horizontal edge. If so, the program flows along the "Y" path to a function block 226 to designate the UL pixel as the bixel designator pixel. The program then flows to the input of a decision block 228. If either the UL pixel is not designated as the left vertical edge or it was not designated as the top horizontal edge, the program would flow from the respective decision blocks 222 and 224 along their "N" paths to the input of the decision blocks 228.

Decision block 228 determines whether the scan is complete. If the scan is not complete, the program flows along an "N" path to a function block 230 to increment the scan by one pixel and then to the input of a decision block 222. Once the scan is complete, the program will flow to a decision block 232 to determine if more scans are required. If so, the program would flow to the function block 230 to increment the scan by one pixel, which will then return it to the original uppermost left edge of the image and then to the input of decision block 222. When all scans are completed, the program will flow along the "N" path from the decision block 232 to the input of a function block 234 to align all of the bixel designators and then to a function block 236 to store the raw image data as the final image. The program then flows to a return block 238.

In summary, there has been provided an image reconstruction technique that utilizes cellular automata. The cellular automata routine is applied to the output of a holographic image detector that is used in conjunction with a holographic data storage system. The image is comprised of a binary array of black and white images each representing one state of a binary image. Therefore, there will be a plurality of binary images. These binary images are typically arranged on a grid which corresponds to the detector pixels. A Margolus neighborhood is defined and disposed about the outputs of a predetermined number of the detector pixels and then the resultant image processed in accordance with the various transformation rules. The first transformation rule is one that enhances the contrast. Thereafter, the edges of each of the images are defined followed by an alignment of the images.

Although the preferred embodiment has been described in detail, it should be understood that various changes, substitutions and alterations can be made therein without departing from the spirit and scope of the invention as defined by the appended claims.

What is claimed is:

1. A method for receiving an optically generated two dimensional composite data image comprised of a plurality of discrete multi-state data images and correcting for any distortions in the composite data image, comprising the steps of:

providing a detector array having a plurality of pixel detector elements aligned in a pattern substantially corresponding to the position of the discrete multi-state data images in the composite data image under ideal circumstances, each of said pixel elements having an output that varies from a low intensity level to a high intensity level, with the multi-state levels corresponding to finite predetermined intensity levels;

disposing the composite data image on the detector array;

processing the output of the detector array when the composite data image is misaligned with respect to the pixels in the detector array, which misalignment may cause the output of the pixels to be ambiguous in certain areas of the detector array with a level between the finite predetermined intensity levels associated with the multi-state levels, the step of processing utilizing a cellular automata algorithm to alter the output of select ones of the pixels to an intensity level associated with one of the multiple state levels determined by the cellular automata algorithm to be correct state in order to create a reconstructed composite image; and outputting the reconstructed composite image for decoding of the data therein.

2. The method of claim 1, and further comprising decoding the data from the reconstructed composite image.

3. The method of claim 1, wherein the multi-state data images are binary data images.

4. The method of claim 3, wherein the pattern on the detector array is a two-dimensional grid with each of the discrete data images being polygonal in shape and disposed adjacent each other.

5. The method of claim 4, wherein each discrete data image is associated with a plurality of the pixels in the detector array.

6. The method of claim 5, wherein the step of processing comprises:

creating at least one state machine cell for encompassing a predetermined number of pixels in the detector array; and altering the state of the pixels in the state machine cell in accordance with predetermined transformation rules based upon the output of the pixels associated with the state machine cells.

7. The method of claim 6, wherein the step of creating at least one state machine cell comprises creating a plurality of state machine cells associated with different pixels that operate in parallel.

8. The method of claim 6, and further comprising moving the state machine cell in accordance with a processing algorithm such that the step of processing moves the cell across the two-dimensional surface of the array output.

9. The method of claim 8, wherein the step of moving the state machine cell across the two-dimensional surface of the array output comprises moving a plurality of cells across the two-dimensional surface of the array output in a pipeline manner.

10. The method of claim 6, wherein the transformation rules operate to adjust the contrast of the composite image by converting the output of pixels having an output between two of the multi-state levels to only one of the multi-state levels in accordance with predetermined threshold criteria.

11. The method of claim 6, and further comprising, designating which of the pixels within the cell are associated with a horizontal or vertical edge.

12. The method of claim 6, wherein the state machine cell encompasses only the number of cells associated with a single discrete data image and the transformation rules are operable to designate one of the pixels as a data image designator whenever it is determined by the transformation rules that the state machine cell is disposed over the pixels associated with one of the data images.

* * * * *